United States Patent [19]

Tom

[11] Patent Number: 4,507,453

[45] Date of Patent: Mar. 26, 1985

[54] DICYCLOPENTADIENE THERMOSET POLYMER

[75] Inventor: Glenn M. Tom, Wilmington, Del.

[73] Assignee: Hercules Incorporated, Wilmington, Del.

[21] Appl. No.: 497,918

[22] Filed: May 25, 1983

Related U.S. Application Data

[63] Continuation-in-part of Ser. No. 342,455, Jan. 25, 1982, abandoned.

[30] Foreign Application Priority Data

Jan. 6, 1983 [CA] Canada ............................ 419034

[51] Int. Cl.³ ............................................. C08F 132/08
[52] U.S. Cl. .................................................... 526/283
[58] Field of Search ........................................ 526/283

[56] References Cited

U.S. PATENT DOCUMENTS

| | | | |
|---|---|---|---|
| 3,084,147 | 4/1963 | Wilks | 526/283 |
| 3,557,072 | 1/1971 | Vergne et al. | 260/88.2 |
| 3,627,739 | 12/1971 | Devlin | 260/88.2 D |
| 3,684,787 | 8/1972 | Nutzel et al. | 260/93.1 |
| 4,002,815 | 1/1977 | Minchak | 526/283 |
| 4,136,247 | 1/1979 | Tenney et al. | 526/283 |
| 4,136,248 | 1/1979 | Tenney | 526/283 |
| 4,136,249 | 1/1979 | Tenney et al. | 526/283 |
| 4,178,424 | 1/1978 | Tenney et al. | 526/283 |
| 4,380,617 | 4/1983 | Minchak et al. | 526/161 |
| 4,418,179 | 9/1982 | DeWitt et al. | 525/249 |
| 4,426,502 | 1/1984 | Minchak | 526/172 |

FOREIGN PATENT DOCUMENTS 53-92000  8/1978 Japan.
53-111399 9/1978 Japan.

OTHER PUBLICATIONS

Die Makromolckulare Chemie; G. Dall'Asta, G. Motroni, R. Manetti, and C. Tost; "Homopolymerization of Dicyclopentadiene Induced by Ziegler–Natta Catalysts and by Other Transition Metal Systems"; 1969; vol. 130; pp. 153–165.

Bulletin of Chemical Society of Japan; vol. 41; Takao Oshika and Hiroyoshi Tabuchi; "Ring–Opening Polymerization of Norbornene and Its Derivatives by $MoCl_5$, $WCl_6$ and $ReCl_5$ Catalyst"; 1968; pp. 211–217. CA 69: 97246v (1968).

*Primary Examiner*—Paul R. Michl
*Attorney, Agent, or Firm*—Dale R. Lovercheck

[57] ABSTRACT

A high impact strength, high modulus thermoset homopolymer is formed by the metathesis-catalyzed polymerization of dicyclopentadiene. In a preferred embodiment of the synthesis, two parts of a metathesis-catalyst system, a catalyst/monomer solution and an activator/monomer solution, are combined in the mixing head of a reaction injection molding machine and then injected into a mold. The reaction mixture sets up into a tough, rigid, thermoset polymer with high modulus and excellent impact strength.

2 Claims, No Drawings

DICYCLOPENTADIENE THERMOSET POLYMER

This application is a continuation-in-part of application Ser. No. 342,455 filed Jan. 25, 1982, abandoned.

BACKGROUND OF THE INVENTION

This invention relates to a novel polymer of dicyclopentadiene (hereinafter referred to as DCPD). In particular, it relates to a high modulus, high impact strength, thermoset poly(DCPD) homopolymer which is formed via a metathesis-catalyst system.

Any good thermoset polymer should meet at least two criteria. It should have desirable physical properties and it should lend itself to easy synthesis and forming. Among the most desirable physical properties for many polymers is a combination of high impact strength and high modulus. A standard test for impact strength is the notched Izod impact test, ASTM No. D-256. For an unreinforced thermoset polymer to have good impact strength, its notched Izod impact should be at least 1.5 ft. lb/in. notch. It is desirable that this good impact strength be combined with a modulus of at least about 150,000 psi at ambient temperature. Thermoset polymers with high impact strength and high modulus find useful applications as engineering plastics in such articles of manufacture as automobiles, appliances and sports equipment. Among the critical factors in the synthesis and forming of a thermoset polymer are the conditions required to make the polymer set up or gel. Many thermoset polymers require considerable time, elevated temperature and pressure, or additional steps after the reactants are mixed before the setting is complete.

While some references to poly(DCPD) have been made in the literature, a thermoset homopolymer having high impact strength and high modulus has never been described. Characteristics of thermoset polymers include insolubility in common solvents such as gasoline, naphtha, chlorinated hydrocarbons, and aromatics as well as resistance to flow at elevated temperatures.

Work has been done on the metathesis copolymerization of DCPD with one or more other monomers to produce soluble copolymers. This copolymer formation has resulted in the production of unwanted insoluble by-products. U.S. Pat. No. 4,002,815, for instance, which teaches the copolymerization of cyclopentene with DCPD, describes an insoluble by-product and suggests that the by-product could be a gel of a DCPD homopolymer.

Some work, usually in an attempt to produce soluble poly(DCPD's), has been done on the metathesis homopolymerization of DCPD. Japanese unexamined published patent applications KOKAI 53-92000 and 53-111399 disclose soluble poly(DCPD's). Several syntheses of soluble poly(DCPD) have produced insoluble by-products. Takata et al, J. Chem. Soc. Japan Ind. Chem. Sect., 69, 711 (1966), discloses the production of an insoluble poly(DCPD) by-product from the Ziegler-Natta catalyzed polymerization of DCPD; Oshika et al, Bulletin of the Chemical Society of Japan, discloses the production of an insoluble polymer when DCPD is polymerized with $WCl_6$, $AlEt_3/TiCl_4$ or $AlEt_3/MoCl_5$; and Dall Asta et al, Die Makromolecular Chemie 130, 153 (1969), discloses an insoluble by-product produced when a $WCl_6/AlEt_2Cl$ catalyst system is used to form poly(DCPD).

In U.S. Pat. No. 3,627,739 ('739), a thermoset poly(DCPD) is the object of synthesis. The poly(DCPD) of '739 is brittle, having an Izod impact strength of only 0.78.

Not only is it desirable that the thermoset polymer have high impact strength, but it is also desirable that it be easily synthesized and formed. A reaction injection molding (sometimes hereinafter referred to as RIM) process achieves this second goal by in-mold polymerization. The process involves the mixing of two or more low viscosity reactive streams. The combined streams are then injected into a mold where they quickly set up into a solid infusible mass. RIM is especially suited for molding large intricate objects rapidly and in low cost equipment. Because the process requires only low pressures, the molds are inexpensive and easily changed. Furthermore, since the initial materials have low viscosity, massive extruders and molds are not necessary and energy requirements are minimal compared to the injection molding or compression molding commonly used. For a RIM system to be of use with a particular polymer, certain requirements must be met: (1) the individual streams must be stable and must have a reasonable shelf-life under ambient conditions; (2) it must be possible to mix the streams thoroughly without their setting up in the mixing head; (3) when injected into the mold, the materials must set up to a solid system rapidly; and (4) any additives-fillers, stabilizers, pigments, etc.—must be added before the material sets up. Therefore, the additives selected must not interfere with the polymerization reaction.

BRIEF DESCRIPTION OF THE INVENTION

Now there has been found a novel homopolymer comprising polymerized units of DCPD. The DCPD polymer is a tough, rigid material with high modulus and excellent impact strength. The flexural modulus is in the range of about 150,000 to about 300,000 psi., the notched Izod impact strength is at least 1.5 ft. lb./in. notch and the percent gel swell is less than about 200%.

DETAILED DESCRIPTION OF THE INVENTION

Dicyclopentadiene can be polymerized in such a manner that the resulting product is a thermoset homopolymer having high impact strength and high modulus. The preferred monomer is commercially available endo-DCPD (3a,4,7,7atetrahydro-4,7-methano-1H-indene). The exo-isomer, while not commercially available, can be used just as well. The preferred commercially available material normally has a purity of 96–97%. Commercially available material should be purified in order to prevent impurities from inhibiting the polymerization. The low boiling fraction should be removed. This can be done by stripping away several percent of the unsaturated four to six carbon atom volatiles, i.e., the volatiles distilled below 100° C. at about 90±3 torr. It is often desirable to purify the starting material even further by treatment with silica gel. Additionally, the water content of the starting material should be below about 100 ppm. The presence of water interferes with polymerization by hydrolysis of both the catalyst and the activator components of the catalyst system. For example, water can be removed by azeotropic distillation under reduced pressure. Even after these steps the monomer still contains some impurities. It should be understood, therefore, that throughout this description the term homopolymer refers to the polymer resulting from essentially pure starting material.

The homopolymerization of the purified DCPD is catalyzed by a two part metathesis-catalyst system. One part contains a tungsten containing catalyst, such as a tungsten halide or tungsten oxyhalide, preferably $WCl_6$ or $WOCl_4$. The other part contains an activator such as $SnBu_4$ or an alkylaluminum compound. The alkylaluminum compound can be trialkylaluminum, alkylaluminum dihalide or dialkylaluminum halide where the alkyl group contains one to ten carbon atoms. In the preferred activator the alkyl group is ethyl.

One part of the catalyst system comprises the tungsten containing catalyst, as described above, preferably in solution with DCPD monomer. The tungsten compound if unmodified, will rapidly polymerize the monomer. Consequently, the tungsten compound should first be suspended in a small amount of a suitable solvent. The solvent must not be susceptible to reacting with tungsten compound. For instance, where a tungsten halide is employed the solvent must not be susceptible to halogenation. Examples of preferred solvents are benzene, toluene, chlorobenzene, dichlorobenzene, and trichlorobenzene. Sufficient solvent should be added so that the tungsten compound concentration is between about 0.1 and 0.7 mole per liter of solvent.

The tungsten compound can be solubilized by the addition of a small amount of an alcoholic or a phenolic compound. Phenolic compounds are preferred. Suitable phenolic compounds include phenol, alkyl-phenols, and halogenated phenols, with tert-butyl phenol, tert-octyl phenol and nonyl phenol being most preferred. The preferred molar ratio of tungsten compound/phenolic compound is from about 1:1 to about 1:3. The tungsten compound/phenolic compound solution can be made by adding the phenolic compound to a tungsten compound/organic solvent slurry, stirring the solution and then blowing a stream of a dry inert gas through the solution to remove the hydrogen chloride which is formed. Alternatively, a phenolic salt, such as a lithium or sodium phenoxide, can be added to a tungsten compound/organic solvent slurry, the mixture stirred until essentially all the tungsten compound is dissolved, and the precipitated inorganic salt removed by filtration or centrifugation. All of these steps should be carried out in the absence of moisture and air to prevent deactivation of the catalyst.

To prevent premature polymerization of the tungsten compound/monomer solution, which would occur within a matter of hours, from about 1 to about 5 moles of a Lewis base or a chelating agent can be added per mole of tungsten compound. Preferred chelants include acetylacetones, alkyl acetoacetates, where the alkyl group contains from one to ten carbon atoms; preferred Lewis bases are nitriles and ethers such as benzonitrile and tetrahydrofuran. The improvement in the stability and shelf-life of the tungsten compound/monomer solution is obtained whether the complexing agent is added before or after the phenolic compound. When purified DCPD is added to this catalyst solution it forms a solution which is stable and has a shelf-life of several months.

The other part of the metathesis-catalyst system comprises the activator, as described above, preferably in DCPD monomer. If an unmodified activator/monomer solution is mixed with the catalyst/monomer solution, the polymerization would initiate instantaneously and the polymer could set up in the mixing head. The onset of polymerization can be delayed by adding a moderator to the activator/monomer solution. Ethers, esters, ketones and nitriles can act as moderators for the alkylaluminum compounds. Ethyl benzoate and butyl ether are preferred. The preferred ratio of the alkylaluminum to moderator is from about 1:1.5 to about 1:5 on a molar basis.

The polymerization time required for gelation is also temperature dependent. As the temperature at which the reaction is carried out is increased the reaction rate will also increase. For every eight degree increase in temperature the reaction rate will approximately double. Consequently, to keep the reaction rate controlled at higher reaction temperatures a less active formulation of the metathesis-catalyst system should be used. One way of reformulating the system is by choice of moderator. Other ways will be readily determinable by one skilled in the art.

What is ultimately required is that when the catalyst system's components are combined, the resulting DCPD to tungsten compound ratio will be from about 1,000:1 to about 15,000:1 on a molar basis, preferably 2,000:1 and the DCPD to alkylaluminum ratio will be from about 100:1 to about 2000:1 on a molar basis, preferably about 200:1 to about 500:1. To illustrate a preferred combination: sufficient DCPD is added to a 0.1M tungsten containing catalyst solution prepared as described above, so that the final tungsten compound concentration is 0.007 molar. This corresponds to a DCPD to tungsten compound ratio of 1000:1. Sufficient DCPD is added to the $Et_2AlCl$ solution, prepared as described above, so that the alkylaluminum concentration is 0.048M. This corresponds to a DCPD to alkylaluminum ratio of 150:1. If these two streams are mixed in a 1:1 ratio, the final ratio of DCPD to tungsten compound will be 2000:1, the final ratio of DCPD to alkylaluminum will be 300:1 and the final ratio of tungsten compound to alkylaluminum will be about 1:7. The illustrated combination is not the lowest catalyst level at which moldings can be made, but it is a practical level that provides for excess catalyst if impurities in the system consume some of the catalyst components. A higher alkylaluminum level will not only increase costs and residual chlorine levels but may result in a less satisfactory cure. Too low a tungsten compound concentration results in incomplete conversion. A wide range of alkylaluminum activator to tungsten catalyst formulations produce samples which have good out-of-mold properties such as tear resistance, stiffness, residual odor, and surface properties.

In a preferred synthesis, the poly(DCPD) is made and molded with the RIM process. The two parts of the metathesis-catalyst system are each mixed with DCPD, to form stable solutions which are placed in separate vessels. These containers provide the source for separate streams. The two streams are combined in the RIM machine's mixing head and then injected into a warm mold where they quickly polymerize into a solid, infusible mass. The invention is not intended to be limited to systems employing two streams each containing monomer. It will be obvious to one skilled in the art that there may be situations where it is desirable to have monomer incorporated in just one stream or to employ more than two streams where the additional streams contain monomer and/or additives.

These streams are completely compatible with conventional RIM equipment. Metathesis-catalyzed polymerizations are known to be inhibited by oxygen so it is necessary to store the components under an inert gas but, surprisingly, it is not necessary to blanket the mold with an inert gas. The streams are combined in the mixing head of a RIM machine. Turbulent mixing is easy to achieve because the process involves low molecular weight, rapidly diffusing components. Typically the mixing heads have orifices about 0.032 inch in diameter and a jet velocity of about 400 ft/sec. After being combined the mixture is injected into a mold maintained at 35°–100° C., preferably 50°–70° C. The mold pressure is in the range of about 10–50 psi. A rapid exothermic reaction occurs as the poly(DCPD) sets up. The mold can be opened in as little as 20–30 seconds after the combined streams have been injected. In this short time heat removal is not complete and the polymer is hot and flexible. The polymer can be removed from the mold immediately while hot or after cooling. After the polymer has cooled it will become a rigid solid. The total cycle time may be as low as 0.5 minute. Post-curing is desirable but not essential, to bring the samples to their final stable dimensional states, to minimize residual odors, and to improve final physical properties. Post-curing at about 175° C. for about 15 minutes is usually sufficient.

The product has a flexural modulus of about 150,000 to 300,000 psi and a notched Izod impact resistance of at least about 1.5 ft. lb/in. notch. The homopolymer is insoluble in common solvents such as gasoline, naphthas, chlorinated hydrocarbons and aromatics, resistant to flow at temperatures as high as 350° C. and readily releases from the mold.

One important property of the thermoset homopolymer, which gives rise to these desirable characteristics, is the extent to which the homopolymer is crosslinked. An indication of the extent of crosslinking is provided by the polymer's gel swell value. Gel swell is determined by a modified version of ASTM D-3616. The measurement is made after the polymer is immersed in toluene for two hours at 100° c. Percent gel swell is defined as final polymer weight minus initial polymer weight, divided by initial polymer weight times one hundred. It has been found that the poly(DCPD)'s of this invention have a swell value less of than about two hundred percent.

Various additives can be included to modify the properties of poly(DCPD). Possible additives include fillers, pigments, antioxidants, light stabilizers and polymeric modifiers. Because of the rapid polymerization time the additives must be incorporated before the DCPD sets up in the mold. It is often desirable that the additives be combined with one or both of the catalyst system's streams before being injected into the mold. Fillers can also be charged to the mold cavity, prior to charging the reaction streams, if the fillers are such that the reaction stream can readily flow around them to fill the remaining void space in the mole. It is essential that the additives not affect catalytic activity.

One class of possible additives is reinforcing agents or fillers. These are compounds which can increase the polymer's flexural modulus with only a small sacrifice in impact resistance. Possible fillers include glass, wollastonite, mica, carbon black, talc, and calcium carbonate. It is surprising that in spite of the highly polar nature of their surfaces these fillers can be added without appreciably affecting the polymerization rate. From about 5% to 75% by weight may be incorporated. This and all subsequent percentages are based on the weight of the final product. The addition of fillers which have modified surface properties are particularly advantageous. The exact amount of a particular filler to be used in a particular situation will be easily determinable and will depend on the preferences of the practitioner. The addition of fillers also serves to decrease the mold shrinkage of the product. After a short post cure at 150°–200° C. an unfilled product will shrink from about 3.0 to about 3.5% whereas adding 20–25 wt% filler will decrease the shrinkage to 1.5–2% and adding 33 wt% filler will further decrease shrinkage to about 1%.

Since poly(DCPD) contains some unsaturation it may be subject to oxidation. The product can be protected by the incorporation of as much as about 2.0 wt% of a phenolic or amine antioxidant. Preferred antioxidants include 2,6-tertbutyl-p-cresol, N,N'-diphenyl-p-phenylene diamine and tetrakis[methylene(3,5-di-t-butyl-4-hydroxy cinnamate)]methane. While the antioxidant can be added to either or both streams, incorporation into the activator/monomer stream is preferred.

The addition of a elastomer can increase the polymer's impact strength 5–10 fold with only a slight decrease in flexural modulus. The elastomer can be dissolved in either or both of the DCPD streams in the 5–10 wt% range without causing an excessive increase in the solution viscosity. Useful elastomers include natural rubber, butyl rubber, polyisoprene, polybutadiene, polyisobutylene, ethylene-propylene copolymer, styrene-butadiene-styrene triblock rubber, styrene-isoprene-styrene triblock rubber and ethylene-propylene diene terpolymers. The amount of elastomer used is determined by its molecular weight and is limited by the viscosity of the streams. The streams cannot be so viscous that adequate mixing is not possible. The Brookfield viscosity of DCPD is about 6 cps at 35° C. Increasing the viscosity to between about 300 cps and about 1000 cps alters the mold filling characteristics of the combined streams. An increase in viscosity reduces leakage from the mold and simplifies the use of fillers by decreasing the settling rates of the solids. An example of a preferred elastomer is styrene-butadiene-styrene triblock. Where 10 wt% of this additive is incorporated into the streams not only is the viscosity increased to about 300 cps but the impact strength of the final product also increases. Although the elastomer can be dissolved in either one or both of the streams it is desirable that it be dissolved in both. When the two streams have similar viscosities more uniform mixing is obtained.

EXAMPLES 1 AND 2

In Example 1 a 0.1M solution of a tungsten containing catalyst solution was prepared by adding 20 grams of $WCl_6$ in 460 ml of dry toluene under a $N_2$ atmosphere and then adding a solution of 8.2 grams of p-tert-butyl phenol in 30 ml of toluene. The catalyst solution was sparged overnight with nitrogen to remove the HCl generated by the reaction of $WCl_6$ with the p-tert-butylphenol. In this and in all the following examples phenol is used as a shorthand for p-tert-butylphenol and for simplicity the solution is referred to as $WCl_6$/phenol. Then a 0.033M catalyst/monomer solution was prepared by mixing under nitrogen 10 ml of DCPD, 0.07 ml of benzonitrile and 5 ml of the 0.1M catalyst solution. An activator/monomer solution was prepared by combining, under nitrogen, 8.6 ml of DCPD, 0.1 ml of isopropyl ether and 0.36 ml of 1.0M $Et_2AlCl$ in DCPD.

Polymerization was accomplished by adding 1.1 ml of the 0.033M catalyst/monomer solution to 8.9 ml of the activator/monomer solution. Both solutions were initially at 25° C. They were vigorously mixed. After a brief induction period a sharp exotherm was observed. A solid, insoluble polymer was formed. The time that elapsed until rapid polymerization began and the total exotherm of the sample above the starting temperature are shown in Table I.

In Example 2 the above procedure was repeated except that 0.36 ml of 1.0M EtAlCl$_2$ was used in place of Et$_2$AlCl to prepare the activator solution and the reaction was started at 40° C. A solid, insoluble polymer was formed. The results are shown in Table I.

TABLE I

|  | Example 1 | Example 2 |
| --- | --- | --- |
| DCPD | 72 mmol | 72 mmol |
| WCl$_6$/Phenol | 0.036 mmol | 0.036 mmol |
| Et$_2$AlCl | 0.36 mmol | — |
| EtAlCl$_2$ | — | 0.36 mmol |
| Benzonitrile | 0.04 mmol | 0.04 mmol |
| Isopropyl Ether | 0.72 mmol | 0.72 mmol |
| Initial Temperature | 25° C. | 40° C. |
| Time Until Exotherm | 15 sec. | 445 sec. |
| Exotherm | 122° C. | 147° C. |

EXAMPLES 3–8

In Examples 3 through 8 the procedure described in Example 1 was repeated except that different moderators were added to the activator/monomer solution. In each example the ratio of moles moderator to moles of Et$_2$AlCl was held constant at 2:1. In example 3, di-n-butyl ether was added while in Example 4, diisopropyl ether was added. In Example 5, ethyl benzoate was used while in Example 6, phenylethyl acetate was added. In Example 7, diisopropyl ketone was added. Lastly, in Example 8, tetrahydrofuran was added. In each example the initial temperature was 25° C. (+1° C.). Example 8 was the only case where a solid insoluble polymer was not obtained. The results are listed in Table II.

TABLE II

| | Example 3 | Example 4 | Example 5 | Example 6 | Example 7 | Example 8 | Example 9 |
| --- | --- | --- | --- | --- | --- | --- | --- |
| DCPD | 72 mmol | 72 mmol | 72 mmol | 72 mmol | 72 mmol | 72 mmol | 72 mmol |
| WCl$_6$/Phenol | 0.036 mmol | 0.036 mmol | 0.036 mmol | 0.036 mmol | 0.036 mmol | 0.036 mmol | 0.036 mmol |
| Et$_2$AlCl | 0.36 mmol | 0.36 mmol | 0.36 mmol | 0.36 mmol | 0.36 mmol | 0.36 mmol | 0.36 mmol |
| Di-n-butyl ether | 0.72 mmol | — | — | — | — | — | — |
| Diisopropyl ether | — | 0.72 mmol | — | — | — | — | — |
| Ethyl benzoate | — | — | 0.72 mmol | — | — | — | — |
| Phenyl ethyl acetate | — | — | — | 0.72 mmol | — | — | — |
| Diisopropyl ketone | — | — | — | — | 0.72 mmol | — | — |
| Tetrahydrofuran | — | — | — | — | — | 0.72 mmol | — |
| Benzonitrile | 0.04 mmol | 0.04 mmol | 0.04 mmol | 0.04 mmol | 0.04 mmol | 0.04 mmol | — |
| Time until Exotherm | 42 sec. | 15 sec. | 60 sec. | 282 sec. | 160 sec. | no rxn. | — |
| Exotherm | 153° C. | 122° C. | 155° C. | 157° C. | 147° C. | — | — |

EXAMPLES 9–12

In Examples 9 through 12 the activator to catalyst ratios were varied. In Example 9, 0.88 ml of catalyst/monomer solution, described in Example 1 was added to 7.1 ml of DCPD containing sufficient Et$_2$AlCl and di-n-butyl ether to give the composition listed in Table III. In Example 10, 0.44 ml of the same catalyst/monomer solution as used in Example 9 was added to 7.5 ml of the same activator/monomer solution used in Example 9, to give the final composition listed in Table III. In Example 11, 4.0 ml of a catalyst/monomer solution prepared by mixing 20 ml of DCPD with 1.5 ml of a 0.1M WCl$_6$/phenol solution, was mixed with 4.0 ml of an activator/monomer solution. In this activator solution there was sufficient Et$_2$AlCl to give a DCPD to alkylaluminum ratio of 100:1 and sufficient di-n-butyl ether to give a di-n-butyl ether to aluminum ratio of 2:1. In Example 12, 4.0 ml of the catalyst/monomer solution used in Example 11 was mixed with 2.0 ml of DCPD and 2.0 ml of the activator/monomer solution used in Example 11. In each case a solid, insoluble polymer was formed. The results of these reactions showing a variation in the exotherms due to variations in the Al/W ratio, are listed in Table III.

TABLE III

|  | Example 9 | Example 10 | Example 11 | Example 12 |
| --- | --- | --- | --- | --- |
| DCPD | 57.6 mmol | 57.6 mmol | 57.6 mmol | 57.6 mmol |
| WCl$_6$/Phenol | 0.029 mmol | 0.0145 mmol | 0.029 mmol | 0.029 mmol |
| Et$_2$AlCl | 0.29 mmol | 0.29 mmol | 0.29 mmol | 0.145 mmol |
| Di-n-butyl ether | 0.58 mmol | 0.58 mmol | 0.58 mmol | 0.29 mmol |
| Benzonitrile | 0.033 mmol | 0.016 mmol | 0.033 mmol | 0.033 mmol |
| DCPD/Al | 200 | 200 | 200 | 400 |
| DCPD/W | 2000 | 4000 | 2000 | 2000 |
| Al/W | 10/1 | 20/1 | 10/1 | 5/1 |
| Time to Exotherm | 50 sec. | 48 sec. | 33 sec. | 43 sec. |
| Exotherm | 153° C. | 120° C. | 145° C. | 168° C. |

EXAMPLES 13–15

In Examples 14–15 a small amount of a polar material was added to the catalyst/monomer solution in order to illustrate the effect of polar material on shelf-life. In Example 13, a catalyst/monomer solution was prepared by adding 2.0 ml of a 0.1M tungsten containing catalyst solution, as described in Example 1, to 20 ml of DCPD in a nitrogen purged tube. This mixture gelled to a non-flowing material within 24 hours. In Example 14, the same procedure was carried out except that 0.03 ml of benzonitrile was added, giving a final benzonitrile to tungsten halide ratio of 1.5:1. This mixture did not gel and was catalytically active after 4 weeks. Example 15 illustrates the result when tetrahydrofuran was added to give a tetrahydrofuran to tungsten halide ratio of 1.5:1. Again, a greatly improved storage stability was observed. The results are listed in Table IV.

TABLE IV

|  | Example 13 | Example 14 | Example 15 |
| --- | --- | --- | --- |
| DCPD | 130 mmol | 130 mmol | 130 mmol |
| WCl$_6$/Phenol | 0.2 mmol | 0.2 mmol | 0.2 mmol |
| Benzonitrile | — | 0.3 mmol | — |
| Tetrahydrofuran | — | — | 0.3 mmol |
| Condition after 24 hours | gelled | low viscosity | low viscosity |
| Condition after 4 weeks | gelled | low viscosity | low viscosity |
| Activity after 4 weeks | gelled | acceptable | acceptable |

EXAMPLES 16-18

In Examples 16-18, the concentration of di-n-butyl ether incorporated into the activator/monomer solution to serve as a moderator was varied. In Example 16, the procedure used in Example 1, was followed with the exception that 0.078 ml of n-butyl ether was substituted for the diisopropyl ether. This gave a final ratio of di-n-butyl ether to alkylaluminum of 1.5:1. In Example 17, the procedure was repeated except that 0.156 ml of di-n-butyl ether was added, giving a final ether/Al ratio of 3:1. In Example 18, sufficient di-n-butyl ether was added to bring the final ether to alkylaluminum ratio to 5:1. All the reactions in Table V were initiated at 25° C. In each case a solid, insoluble polymer was formed. The results of the reactions are listed in Table V.

TABLE V

|  | Example 16 | Example 17 | Example 18 |
| --- | --- | --- | --- |
| DCPD | 57.6 mmol | 57.6 mmol | 57.6 mmol |
| $WCl_6$/Phenol | 0.029 mmol | 0.029 mmol | 0.029 mmol |
| $Et_2AlCl$ | 0.29 mmol | 0.29 mmol | 0.29 mmol |
| Di-n-butyl ether | 0.43 mmol | 0.86 mmol | 1.45 mmol |
| Benzonitrile | 0.033 mmol | 0.033 mmol | 0.033 mmol |
| Ether/Al | 1.5 | 3.0 | 5.0 |
| Elapsed time until exotherm | 36 sec. | 55 sec. | 75 sec. |
| Exotherm | 150° C. | 158° C. | 159° C. |

EXAMPLES 19-21

In Examples 19-21, the level of $Et_2AlCl$ used in the polymerization of DCPD was varied. In Example 19, 18.5 ml of DCPD was mixed under $N_2$ with 1.5 ml of a 1.0M solution of $Et_2AlCl$ in DCPD and with 0.55 ml of di-n-butyl ether. Then in a $N_2$ purged tube 8.9 ml of this activator/monomer solution was mixed with 1.1 ml of a catalyst/monomer solution as described in Example 1. In Example 20, 4.5 ml of the activator/monomer solution used in Example 19 was combined with 4.4 ml of DCPD and 1.1 ml of the catalyst/monomer solution used in Example 20. In Example 21, 2.5 ml of the activator/monomer solution used in Example 19 was combined under $N_2$ with 6.4 ml of DCPD and 1.1 ml of the catalyst/monomer solution used in Example 19. The final compositions of these reaction mixtures are listed in Table VI. All reactions were initiated at 25° C.

TABLE VI

|  | Example 19 | Example 20 | Example 21 |
| --- | --- | --- | --- |
| DCPD | 72 mmol | 72 mmol | 72 mmol |
| $WCl_6$/Phenol | 0.036 mmol | 0.036 mmol | 0.036 mmol |
| $Et_2AlCl$ | 0.72 mmol | 0.36 mmol | 0.20 mmol |
| Di-n-butyl ether | 1.44 mmol | 0.72 mmol | 0.40 mmol |
| Benzonitrile | 0.04 mmol | 0.04 mmol | 0.04 mmol |
| DCPD/Al | 100 | 200 | 360 |
| Di-n-butyl ether/Al | 2/1 | 2/1 | 2/1 |
| Elapsed time until exotherm | 40 sec. | 55 sec. | 144 sec. |
| Exotherm | 150° C. | 151° C. | 145° C. |

EXAMPLES 22-25

The effect of impurities on the catalyst system is illustrated in Examples 22 through 25. In Example 22, a 0.007M solution of $WCl_6$/phenol in DCPD was prepared by mixing under nitrogen 150 ml of DCPD with 10.8 ml of a 0.1M $WCl_6$/phenol solution in toluene and 0.11 ml of benzonitrile. Then 3.0 ml of this solution was mixed under nitrogen with 3 ml of a DCPD solution containing $AlEt_2Cl$ at a level DCPD to alkylaluminum of 150:1 and di-n-butyl ether at a level of ether to alkylaluminum of 1.5:1.

In Example 23, a 10 ml sample of the catalyst/monomer solution used in Example 22 was mixed with an impurity, 0.036 mmol of $H_2O$, added as a dispersion in DCPD. One and one-half hours later, 3 ml of this mixture was mixed under nitrogen with 3.01 of the activator/monomer solution described in Example 22. The reaction was repeated this time combining the activator/monomer solution with the catalyst/monomer solution 18 hours after the $H_2O$ had been added.

Example 24 was done in the same manner as Example 23 with the exception that 0.036 mmol of tert-butyl hydroperoxide was added to a second 10 ml sample of the catalyst solution rather than $H_2O$. The reactivity of the resultant mixture was checked 1½ and 18 hours after the addition of the impurity. Example 25 was carried out in the same manner with the exception that 0.072 mmol of di-tert-butylperoxide was the impurity added initially to 10 ml sample of the catalyst/monomer solution. In every case a solid, insoluble polymer was formed.

TABLE VII

|  | Example 22 | Example 23 | Example 24 | Example 25 |
| --- | --- | --- | --- | --- |
| DCPD | 43 mmol | 43 mmol | 43 mmol | 43 mmol |
| $WCl_6$/Phenol | 0.021 mmol | 0.021 mmol | 0.021 mmol | 0.021 mmol |
| $H_2O$ | — | 0.01 mmol | — | — |
| tert-butyl-hydroperoxide | — | — | 0.01 mmol | — |
| Di-tert-butyl-peroxide | — | — | — | 0.02 mmol |
| $Et_2AlCl$ | 0.14 mmol | 0.14 mmol | 0.14 mmol | 0.14 mmol |
| Added Impurity/W | 0 | 0.5/1 | 0.5/1 | 1/1 |
| Induction Time after 1½ hrs. | 31 sec. | 50 sec. | 98 sec. | 33 sec. |
| Exotherm after 1½ hrs. | 173° C. | 171° C. | 168° C. | 171° C. |
| Induction time after 24 hrs. | 36 sec. | 98 sec. | 266 sec. | 73 sec. |
| Exotherm after 24 hrs. | 170° C. | 170° C. | 155° C. | 169° C. |

EXAMPLES 26-33

Samples of polymerized DCPD were made by RIM processing using a standard RIM machine supplied by Accuratio Co. of Jeffersonville, Ind. The following description illustrates the standard procedure for molding samples. First the desired amount of DCPD was charged into two 2 gallon tanks. The tanks are located on different sides of the RIM machine: the tank on the A side is the one to which the activator was later added and the tank on the B side is the one to which the catalyst was later added. If desired, rubber and/or organic resins were added as a predissolved solution in DCPD. Also solid fillers, if desired, were added.

The tanks were then closed off and inerted with nitrogen. Sufficient $Et_2AlCl$ was transferred into the A tank to bring the alkylaluminum concentration to 0.048M and sufficient di-n-butyl ether was added to achieve an ether to alkylaluminum ratio of 1.5:1. Next, sufficient $WCl_6$/phenol to bring the concentration of the catalyst in the B side to 0.007M was added to the B tank. The catalyst was added as a 0.1M solution in toluene. All transfers were done in a way to preclude the entrance of oxygen or moisture into the system. The materials were then thoroughly blended in their respective tanks.

The mixing of the A stream and the B stream was accomplished using a standard impingement type RIM mixhead. The ratio of the activator/monomer solution mixed with catalyst/monomer solution was 1:1. The impingement mixing was accomplished by passing both the solutions through orifices 0.032" in diameter at a flow rate approximately 80 ml/sec. This required pumping pressure of approximately 1000 psi.

The resulting mixture flowed directly into a mold heated between 50° C. and 60° C. The mold was made out of aluminum and was chrome plated. The mold had a flat cavity which formed a plaque sample 10"×10"×⅛" thick. A clamping force of 1.5 tons was used to keep the mold closed. The finished samples were removed at various times after mold filling ended.

In Example 26, the outlined molding procedure was followed where there was added 10 wt% added styrene-butadiene-styrene rubber (Kraton no. 1102 manufactured by Shell Chemical Co). The sample was removed from the mold after 2 minutes. In Example 27 a material of the same composition as Example 26 was produced. This time mold was opened 30 seconds after the combined streams were injected. The surface features of Example 27 were noticably better than those of Example 26. In Example 28, 10 wt% of a thermally polymerized dicyclopentadiene resin was added in addition to both the catalyst/monomer and the activator/monomer solutions in addition to the styrene-butadiene-styrene rubber.

Various inorganic fillers were incorporated into the DCPD polymer by adding equal amounts to both the catalyst/monomer and the activator/monomer solutions. In Example 29, samples were made containing 33 wt% ⅛" milled glass (P117B grade of Owens Corning Co.). These samples were made by initially slurrying the glass into both solutions the catalyst/monomer and the activator/monomer otherwise, these solutions were identical to those used in Example 28. In Example 30 a composition consisting of 10 wt% wollastonite was made by adding the filler to a formulation identical to that described in Example 28. In Example 31 the same procedure was followed as in Example 30 except that a 33 wt% level of wollastonite was employed. In Example 32, 25 wt% wollastonite was added to formulation described in Example 27. In each case a solid, insoluble polymer is formed. Representative properties of Examples 26–32 are listed in Table VII.

Example 33 is a RIM processed poly(DCPD) made without any rubber additives.

TABLE VIII

|  | Example 26 | Example 27 | Example 28 | Example 29 |
|---|---|---|---|---|
| Resin Composition |  |  |  |  |
| % cyclopentadiene resin | — | — | 10 | 10 |
| % Kraton 1102 | 10 | 10 | 10 | 10 |
| % DCPD | 90 | 90 | 80 | 80 |
| Filler Composition |  |  |  |  |
| wt % ⅛" milled glass | — | — | — | 33 |
| wt % wollastonite | — | — | — | — |
| Tensile Properties |  |  |  |  |
| Strength (psi) | — | 4,860 | 5,230 | — |
| Modulus (psi) | — | 262,000 | 257,000 | — |
| Elongation at yield (%) | — | 4.0 | 4.0 | — |
| Flexural Properties |  |  |  |  |
| Strength (psi) | 7,400 | 8,600 | — | 8,200 |
| Modulus (psi) | 235,000 | 250,000 | — | 526,000[2] |
| Impact Properties |  |  |  |  |
| Notched Izod (ft #/in. notch) | 13.2 | 10.5 | 11.0 | 2.7 |
| Plate Impact at 5000"/min. (ft. #) |  |  |  |  |
| 23° C. | 21.0 | — | — | — |
| 0° C. | 15.7 | — | — | — |
| −20° C. | 12.3 | — | — | — |
| Heat Deflection Temperature at 264 psi (°C.) | — | 65° | 64° | 81° |
| Coefficient of Thermal Expansion (in/in °F.)[2] | — | $6.0 \times 10^{-5}$ | — | $3.2 \times 10^{-5}$ |
| Linear Mold Shrinkage[2] (%) | 2.6 | 3.5 | 3.1 | 1.0 |

|  | Example 30 | Example 31 | Example 32 | Example 33 |
|---|---|---|---|---|
| Resin Composition |  |  |  |  |
| % cyclopentadiene resin | 10 | 10 | — | — |
| % Kraton 1102 | 10 | 10 | 10 | — |
| % DCPD | 80 | 80 | 90 | 100 |
| Filler Composition |  |  |  |  |
| wt % ⅛" milled glass | — | — | — | — |
| wt % wollastonite | 10 | 33 | 25 | — |
| Tensile Properties |  |  |  |  |
| Strength (psi) | 4,700 | — | 4,290 | 5,050 |
| Modulus (psi) | 426,000[1] | — | 683,000[1] | 270,000 |
| Elongation at yield (%) | 3.0 | — | 2.0 | 3.4 |
| Flexural Properties |  |  |  |  |
| Strength (psi) | 9,000 | 8,400 | 8,300 | 8,400 |
| Modulus (psi) | 390,000[2] | 670,000[2] | 480,000[2] | 270,000 |
| Impact Properties |  |  |  |  |
| Notched Izod (ft #/in. notch) | 2.0 | 2.9 | — | 2.3 |
| Plate Impact at 5000"/min. (ft. #) |  |  |  |  |
| 23° C. | 11.2 | — | 11.3 | — |
| 0° C. | 12.0 | — | 11.8 | — |

TABLE VIII-continued

| | | | | |
|---|---|---|---|---|
| −20° C. | 11.9 | — | 12.7 | — |
| Heat Deflection Temperature at 264 psi (°C.) | 69° | — | 79° | 60° |
| Coefficient of Thermal Expansion (in/in °F.)[2] | $5.2 \times 10^{-5}$ | — | $3.8 \times 10^{-5}$ | — |
| Linear Mold Shrinkage[2] (%) | 1.6 | | 1.0 | |
| 1.5 | — | | | |

[1]Value in the direction parallel to the direction of flow.
[2]Value is the average of the values obtained perpendicular to the direction of flow and parallel to the direction of flow.

EXAMPLE 34

A catalyst component was prepared in the following manner:

In an argon filled glove box, 3.96 g. of WCl$_6$ was weighed into a 10 oz. pop bottle. The bottle was then capped. In another 10 oz. pop bottle, 2.21 g. (10 mmol) of nonylphenol was added. This bottle was then capped and sparged with nitrogen for 20 minutes. The nonylphenol was then dissolved in 100 ml. of toluene, and the resulting solution was transferred by cannula to the pop bottle containing WCl$_6$. After marking the solvent level, the bottle was stirred and sprayed with nitrogen for one hour. Acetylacetone, 2.0 gram (20 mmol) was then added by syringe and the mixture was sparged rapidly and stirred overnight. Toluene was then added to restore the solvent level and the resulting solution was divided among ten 4" polyethylene tubes that had been capped and sparged. These were stored under nitrogen.

An activator component was prepared in the following manner:

A 4" polyethylene tube was capped and sparged. 8 ml. of toluene was syringed into the tube. 2.0 ml. of a 1.8M solution of diethyl aluminum chloride in toluene was added by a syringe. 0.49 grams of butyl ether was then added by syringe.

The polymerization was accomplished in the following manner:

A 15×125 mm test tube was capped with a rubber stopper and sparged with N$_2$. The tube was then charged with 5 ml. of DCPD. 0.19 ml. of the catalyst component and 0.038 grams of butyl ether were added by syringe. Then, 0.15 ml. of the activator component was added by syringe and the sample was shaken several times to mix the components. The mixture was allowed to stand and polymerize.

The percent gel swell was determined by the following method:

A 5 gram sample of the polymer was broken out of its test tube and sliced into approximately 1 cm.×1.3 cm. diameter cylinders. Each slice was then weighed and placed on a stainless steel wire. The wire and sample were hung in about 50 ml. of toluene in a 1 liter round bottom flask and the toluene was allowed to reflux overnight. After cooling, the samples were removed from the flask, patted dry, and weighed. Percent gel swell was determined according to the following equation:

$$\text{Percent Gel Swell} = \frac{\text{Final polymer weight} - \text{initial polymer weight}}{\text{initial polymer weight}} (100)$$

It was found that the sample had a percent swell of 110%.

What I claim and desire to protect by Letters Patent is:

1. A method of mold forming substantially crosslinked thermoset homopolymer product comprising polymerized units of dicyclopentadiene from dicyclopentadiene monomer comprising:
   (a) providing a mold means having a polymerization chamber;
   (b) providing a polymerization solution comprising dicyclopentadiene monomer, activator and catalyst, said dicyclopentadiene comprising a substantial majority on a weight percent basis of said polymerization solution;
   (c) polymerizing in about 0.5 minute said polymerization solution in said polymerization chamber of said mold means to form a substantially crosslinked homopolymer product comprising polymerized units of dicyclopentadiene, said crosslinking being effective to characterize said homopolymer as having a flexural modulus of at least 150,000 psi at ambient temperature, a notched-Izod impact strength of at least about 1.5 ft. lb./in. notch, and a percent gel swell, determined after the polymer is immersed in toluene for two hours at 100° C. of less than about 200%, said homopolymer product having substantially the form of said reaction chamber.

2. The method of claim 1 wherein said dicyclopentadiene monomer is purified dicyclopentadiene.

* * * * *